Nov. 23, 1926.

C. T. HIBBARD 1,608,314

FIELD POLE AND ROTOR CONSTRUCTION

Filed Oct. 2, 1922

INVENTOR
CHARLES TRUMAN HIBBARD

By Paul, Paul & Moore
ATTORNEYS

Patented Nov. 23, 1926.

1,608,314

UNITED STATES PATENT OFFICE.

CHARLES TRUMAN HIBBARD, OF MINNEAPOLIS, MINNESOTA, ASSIGNOR TO ELECTRIC MACHINERY MANUFACTURING COMPANY, OF MINNEAPOLIS, MINNESOTA, A CORPORATION OF MINNESOTA.

FIELD POLE AND ROTOR CONSTRUCTION.

Application filed October 2, 1922. Serial No. 591,852.

This invention relates to new and useful improvements in the construction of revolving field pole pieces, such as are commonly used in the construction of rotors for electric motors and generators, and is more particularly adapted for use in such electric machines operating at a very high speed.

High speed motors and generators such as the well known two-four-or six-pole piece types, often require very heavy field pole pieces in their rotor construction to produce the electrical results desired. These pole pieces are usually built up of laminated magnetic sheet metal securely riveted together, each pole thus forming a unit in itself before being assembled in the rotor. In machines of this type and particularly in the four-pole piece type, difficulty is often experienced in designing a safe and suitable means for anchoring the pole pieces to the rotor shaft, due to the enormous centrifugal force resulting from the rapidly revolving pole pieces upon the shaft. It is also difficult to anchor the pole pieces to the rotor shaft without weakening the shaft and with retention of sufficient cross-section for the magnetic flux from the pole to pole. At present the above difficulty is overcome in various ways: For example, there is provided a shaft-forging having an enlarged integral central portion upon which the pole pieces are rigidly mounted by such means as dovetailing, etc., which necessarily incurs considerable expense due to the cost of such forging and the amount of mechanical labor required to prepare same for assembling; or, another example is the construction of the four poles in a single piece with a central hole into which a shaft is passed. In this latter case, the field coils must be wound on each pole after assembly. This is tedious and expensive. Coils have also been separately wound and thereafter slipped upon the poles, but for high speed such coils are not safe.

In this novel invention, means are provided whereby the pole pieces, after they have been wound in the usual way, may be readily and quickly assembled or joined together to form a complete rotor independent of the shaft on which they are to be mounted. The coil is retained at both ends making a self-contained rigid unit of the pole piece and its coil. Also by the employment of this improved construction, the centrifugal force resulting from the revolution of the pole pieces will be equally distributed and a magnetic path is also provided which path is additional to and independent of the shaft.

The specific object of this invention, therefore, is to provide an improved field pole piece and rotor construction.

Other objects of the invention will more fully appear from the following detailed description and the accompanying drawings and will be pointed out in the annexed claims.

In the accompanying drawings there has been disclosed a structure adapted to carry out the objects of the invention, but it is to be understood that the invention is not confined to the exact features shown, and various changes may be made within the scope of the claims which follow.

Figure 1:
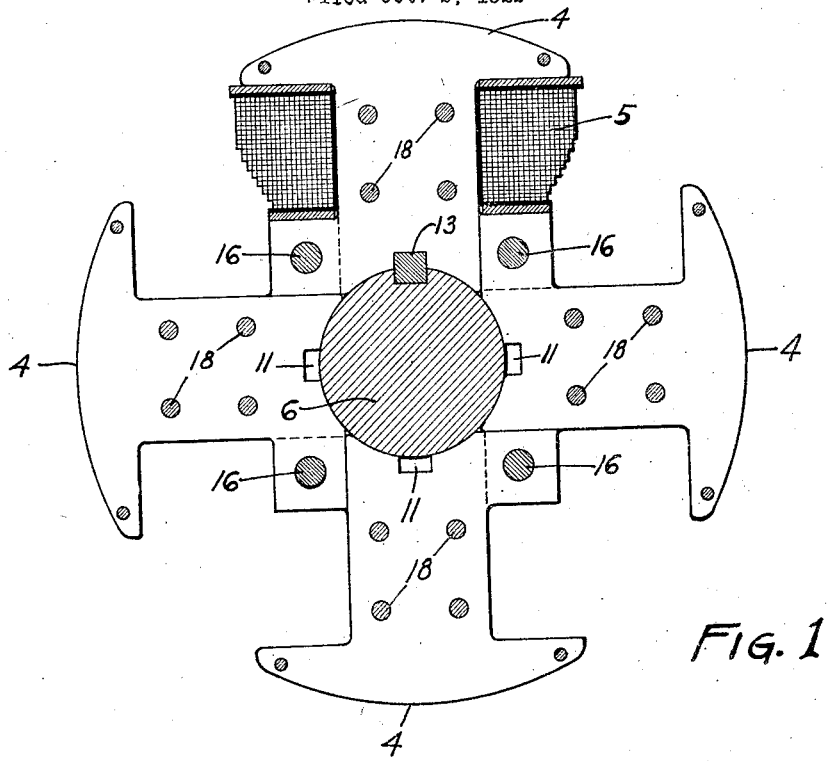
Figure 1 is a view in cross-section of an assembled rotor and showing the means provided for interlocking the pole pieces with each other to form a complete rotor, some of the windings being omitted.
Figure 3:
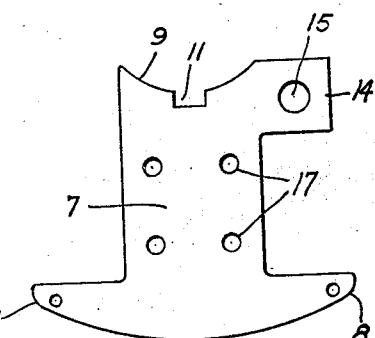
Figure 3 is a plan view of one of the sheet-metal punchings or laminations used in the construction of a pole member.

In the selected embodiment of the invention here shown there is illustrated an assembled rotor, such as is commonly used in the construction of electric motors and generators. This rotor comprises the usual field poles 4 on which the field coils 5 are wound. These pole pieces or members and coils are rigidly mounted upon the usual shaft 6. While these novel pole members may be integrally formed and provided with the novel interlocking device, they are preferably formed of a plurality of members of magnetic sheet material each such member or lamination being formed with this novel device. In Figure 3, there is shown such a pole-punching or lamination adapted for use in the construction of these novel field pole pieces or members. It has a body 7 and pole tips 8. An arcuately formed surface 9, corresponding to the curvature of the shaft 6 on which it is to be mounted, is provided at one end of the pole body, as shown in Figure 1. A recess or notch 11 is also preferably provided at this curved end of the pole punching and its function is to provide a suitable keyway adapted to receive key 13 when the rotor is assembled and mounted upon the shaft.

A novel rectangular lug 14 is preferably provided on one side of the pole body 7 and is integrally formed therewith, as shown in Figure 3. An aperture 15 is provided in the lug 14 and is adapted to receive a suitable rivet or pin 16 when the rotor is assembled as shown in Figure 1. The apertures 17 are provided in the pole body 7 to receive the rivets 18.

Figure 2:
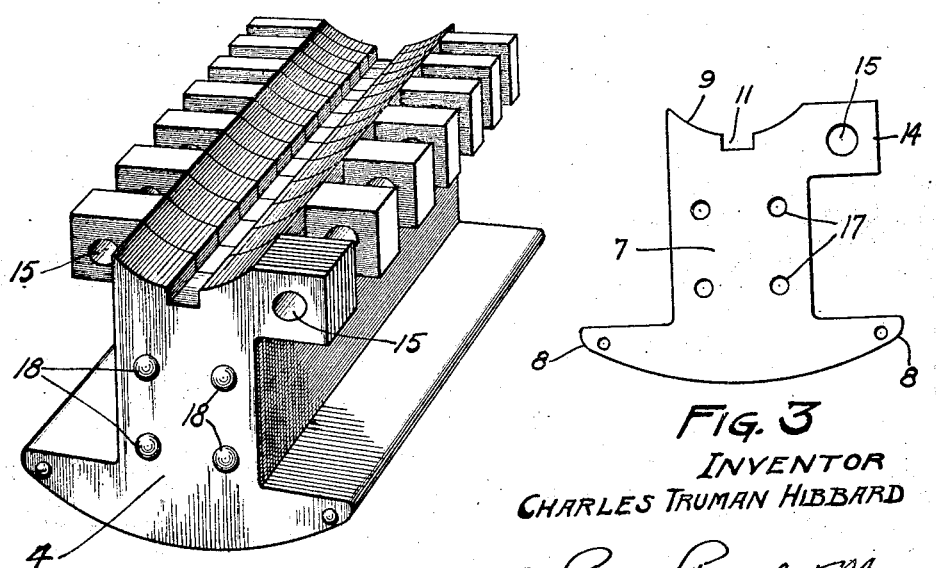
Figure 2 is a perspective view of an assembled field pole member without the winding.

In assembling this novel field pole member, the pole punchings or laminations are stacked in groups upon the rivets 18, upon any suitable table or bench, each succeeding group being placed upon the preceding one in reversed relation until the desired pole length has been attained. Thus the lugs 14 of each group are alternately oppositely disposed so that the groups are in spaced relation in order to receive the similar groups of the adjacent pole pieces or members in interlapping or interposed relation. The ends of the rivets 18 are then headed over so that the pole punchings are securely riveted together and the assembled pole piece is completed as shown in Figure 2. The field coils 5 are then wound upon the pole pieces, thereby completing the field poles preparatory to being assembled in the rotor.

The pole punchings may be grouped in any quantity desired to produce the most suitable size interlocking lugs, but it is to be understood that said punchings are preferably uniformly grouped and stacked, in all of the field pole pieces or members required for a given motor or generator, so as to assure that the lugs will perfectly interlock with each other when the field pole pieces are assembled in the rotor, as shown in Figure 1. As soon as the field pole pieces have been fitted together the pins 16 are inserted in the alined apertures 15, thus securely interlocking the pole pieces with each other. These rivets or pins may be headed over or not as desired, as they cannot work loose when the rotor is revolving due to the centrifugal action of the field poles acting thereon.

By the use of this improved construction the entire rotor may be completely assembled without the usual shaft, and also in much less time than is ordinarily required with the present construction, thus reducing the cost of assembling to a minimum. There has been shown a four pole type of rotor in the accompanying drawings, but it is to be understood that the invention is not limited to this particular type of machine as the above described construction may be adapted to a two pole machine equally as well and also to machines having a greater number of poles, such as six, eight or ten pole machines.

I claim as my invention:

1. A rotor comprising a plurality of field pole members, each member having lugs projecting therefrom and positioned to permit a coil to be wound about the body of the member and have the lugs of one pole member interlap with the lugs of an adjacent pole member when in assembled relation, means securing together the interlapping lugs of adjacent pole members, and a shaft whereon the pole members are mounted.

2. A rotor comprising a plurality of field pole members, each formed with groups of lugs projecting from opposite sides and positioned to permit a coil to be wound about the body of the member and have the groups of one pole member interlap with corresponding lug groups of an adjacent pole member, means passing through the interlapping lugs of adjacent members to secure the members together, and a shaft whereon the pole members are mounted.

3. A rotor comprising a central shaft, a plurality of field pole members secured on said shaft, each field pole member having a plurality of lugs spaced apart projecting outwardly therefrom upon opposite sides, the lugs of one pole member passing between the corresponding lugs of the adjacent pole member, and means passing through the lugs so interlapped for rigidly securing them together.

4. A rotor comprising a central shaft, a plurality of field pole members seated on said shaft and secured thereon, each field pole member having a plurality of lugs spaced apart projecting outwardly therefrom upon opposite sides, the lugs of one pole member passing between the corresponding lugs of the adjacent pole member, said lugs having holes therein and means passing through the interlapping lugs of adjacent pole members and securing them and said pole members together.

5. A field pole member comprising an elongated body portion adapted to have a coil wound thereabout, one end of said portion having opposed projections, the other end thereof being terminally concave to fit a rotor shaft, and a lug projecting from said body portion adjacent said concave end whereby the members of adjacent pole members of a rotor may be interlocked.

6. A field pole member comprising an elongated body portion adapted to have a coil wound transversely thereabout, one end of said portion having opposed integral projections, the other end thereof being terminally concave to fit a rotor shaft, and a lug integrally projecting from said body portion adjacent said concave end whereby the members of adjacent pole members of a rotor may be interlocked.

7. A rotor comprising a plurality of field pole members, each member composed of a plurality of superposed laminations arranged in group formation with the surfaces of superposed laminations in mutual engagement and a lug projecting from each lamination adjacent its base, the lugs of one group of laminations being disposed on the opposite side of the pole member from those of the adjacent group of laminations and positioned to have the lugs of one member to interlock with corresponding lugs of the adjacent pole member.

In witness whereof, I have hereunto set my hand this 27th day of September, 1922.

CHARLES TRUMAN HIBBARD.